Jan. 12, 1932.   H. J. ROSE   1,840,977
TREATMENT OF LIQUID CONTAINING TAR ACID
Filed Dec. 20, 1928
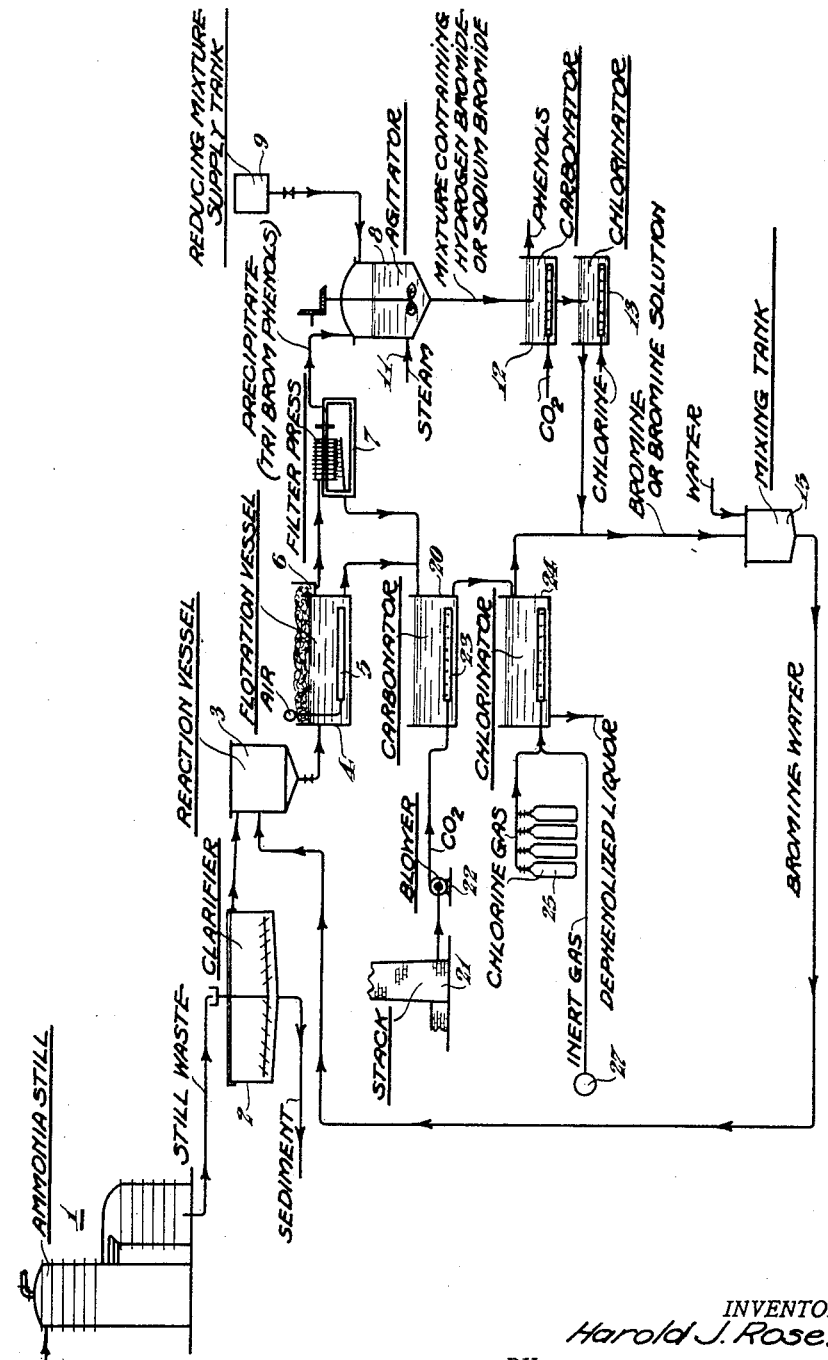
INVENTOR.
Harold J. Rose.
BY Jesse P. Langley
ATTORNEY.

Patented Jan. 12, 1932

1,840,977

UNITED STATES PATENT OFFICE

HAROLD J. ROSE, OF PENN TOWNSHIP, ALLEGHENY COUNTY, PENNSYLVANIA, ASSIGNOR TO THE KOPPERS COMPANY, A CORPORATION OF DELAWARE

TREATMENT OF LIQUID CONTAINING TAR ACID

Application filed December 20, 1928. Serial No. 327,349.

My invention relates to the treatment of liquids, such as ammonia liquor, ammonia still waste, tarry liquids, or other liquids containing tar acid, for the removal of tar acid therefrom.

In the manufacture of coal gas considerable quantities of ammoniacal liquor, known as "gas liquor," are produced. When this liquor is distilled for recovery of free and fixed ammonia in the usual manner, the addition of lime to the liquor being distilled for the purpose of decomposing the fixed ammonia compounds causes the formation of calcium phenolates which are not volatile and which therefore are contained in the effluent liquor or still waste leaving the distillation apparatus.

Modern legislation is tending to make it impossible to dispose of such still waste, as such, by prohibiting the drainage of liquid containing tar acid or tar acid compound into sources of community water supply. Consequently, it is highly important to provide successful means for accomplishing the removal of tar acid or tar acid compound from such liquors.

It is also often desirable to remove tar acid from other types of liquids, for example, high and low temperature coal tars and various processes have been proposed for this purpose.

An object of my invention is to provide an economical and efficient process of removing tar acid from liquids of the character described.

A second object of my invention is to provide a process of removing tar acid from a liquid containing it in which the reagent employed to remove the tar acid from the liquid may be recovered and used again in cyclic fashion.

A further object of my invention is to provide an improved method of precipitating tar acid from a liquid containing it and of removing this precipitate.

A still further object of my invention is to provide a process of removing tar acid from a liquid containing it in which the tar acid is precipitated from the liquid and transferred to another liquid by means of a reagent and whereby the final separation of the tar acid from this reagent may be accomplished under advantageous conditions of concentration and volume.

A still further object of my invention is to provide a process of treating a liquid to recover tar acid therefrom with a reagent and including novel and effective means for recovering portions of the reagent retained in the liquid treated.

My invention has for further objects such other operative advantages or results as may hereinafter be found to obtain.

According to my invention I accomplish the removal of tar acid from a liquid containing it by treating the liquid with a reagent effective to precipitate the tar acid in the form of a compound of the tar acid and the reagent. I then accomplish the separation of this precipitate containing the tar acid by some suitable means, such as filtration, but preferably by a flotation operation and treat it under advantageous conditions of concentration and volume for the decomposition of the precipitated compound into its constituents, namely, tar acid and the reagent or a compound thereof.

I also provide means whereby portions of the reagent remaining in the liquid being treated after the separation of tar acid therefrom may be recovered. The reagent thus recovered and the reagent recovered from the precipitated tar acid compound are brought together and returned in cyclic manner for the treatment of further quantities of liquid.

In order that my invention may be clearly set forth and understood, I now describe with reference to the accompanying drawing the preferred manner in which it is accomplished and embodied. In this drawing, The single figure is a more or less diagrammatic representation of a process of removing tar acid from ammonia liquor according to the present invention.

In the specific instance illustrated, my process is employed for the removal of tar acid from the effluent liquor from the distillation of an ammoniacal liquor such as gas liquor.

The distillation of the ammoniacal liquor is effected in an ammonia still 1. In this still, which is of the usual type employed for the treatment of gas liquor or other ammoniacal liquor containing both free and fixed ammonia, the liquor is first subjected to steam distillation for the removal of free ammonia and is then treated with lime and again disstilled with steam for the decomposition of fixed ammonia compounds and the removal of their ammonia content.

Under ordinary conditions, the temperatures in the still 1 are too low to permit volatilization of more than about a third of the tar acid from the liquor being distilled. Consequently, the major portion of the tar acid originally present in the ammoniacal liquor escapes from the ammonia still in the form of calcium compounds, such as calcium phenolate, in the effluent liquor or still waste.

This still waste ordinarily contains, in addition to calcium phenolate, some excess calcium hydroxide, and considerable quantities of other calcium compounds. Before treating it for the recovery of tar acid therefrom, it is preferred to accomplish a separation of insoluble material from the still waste by suitable means, as for example, by sedimentation in a clarifier 2.

The clarified still waste is then treated in a suitable reaction vessel 3 with a slight excess of bromine water whereby a more or less colloidal precipitate of tri-brom-phenol is formed.

This precipitate of tri-brom-phenol may be removed from the liquid in any suitable manner, but I prefer to accomplish its removal by subjecting the liquid to a flotation operation.

This operation is preferably conducted in a relatively shallow flotation vessel 4 that is provided with a plurality of aerators 5 adapted to introduce air in finely comminuted state into the liquid within the flotation vessel 4. This finely comminuted air causes a flotation of the tri-brom-phenol precipitate in the form of a foam or froth upon the surface of the liquid. The froth overflows into a trough or launder 6 and passes to a separating device, such as a filter press 7, by means of which excess amounts of the liquid being treated are removed from the precipitate.

The tri-brom-phenol precipitate from the filter press 7 is then transferred to an agitator vessel 8 in which it is treated by a reducing mixture effective to generate nascent hydrogen which liberates the bromine from the tri-brom-phenol in the form of hydrogen bromide. Such a reducing mixture may be of an acid type such as a mixture of iron or zinc and hydrochloric acid, or of an alkaline type of a mixture of zinc or aluminium and caustic soda solution.

In the latter case, that is, when an alkaline reducing agent such as a mixture of zinc and caustic soda is employed, it is obvious that the hydrogen bromide liberated in the first instance will immediately react with the alkali with formation of sodium bromide.

The reducing mixture is supplied to the agitator from a suitable supply tank 9 and is stirred in the agitator 8 with the tri-bromphenol precipitate. The agitator 8 may be provided with a suitable steam supply 11 for increasing the effectiveness and speed of the reaction. The agitator 8 may also be of a closed type so that the pressure will build up under the heat supplied or due to the evolution of gas and may further increase the effectiveness and speed of the reaction.

Ordinarily I prefer to employ an alkaline reducing mixture of zinc and caustic soda solution. When such a mixture is employed, the resulting products consist principally of sodium bromide and sodium phenolate.

In order to accomplish the separation of tar acid and bromine from this resultant liquid, I first transfer the mixture containing the sodium bromide and sodium phenolates to a carbonating tank 12 where the solution is treated with carbon dioxide gas or other suitable agent for the liberation of tar acid in free form. The liberated tar acid may be removed from the solution in any known manner.

It is apparent that when an acid reducing agent, such as a mixture of zinc and hydrochloric acid, is employed, the tar acid will be liberated as such, and will not require the use of carbon dioxide or other "springing agent" for its liberation or removal.

The resulting bromide solution may then be treated for the recovery of the bromine in any suitable manner; for example, the bromine may be liberated by chlorination, by electrolysis, or by oxidizing with manganese dioxide and sulphuric acid.

Ordinarily, however, I prefer to transfer the bromide solution to a chlorinator vessel 13 where the solution is treated with chlorine gas. The bromine liberated upon such treatment is transferred to a mixing tank 15 where it is dissolved in water and the resultant bromine water is returned to the reaction vessel 3 for the treatment of further quantities of liquid containing tar acid.

In many cases, it is possible to transfer the solution from the chlorinator 13 directly to the dissolving tank, instead of separating the bromine as such and transferring it alone. The solution from the chlorinator 13 may contain additional material, such as sodium chloride, but the presence of this material is not objectionable, as it is dissolved in the liquid subsequently treated and is removed therewith, and does not accumulate in the reagent.

Both the body of liquid remaining in the flotation vessel 4 and the excess liquid removed from the filter press 7 contain considerable amounts of bromine in the form of calcium bromide. In order to recover this valuable material, I first transfer these liquids to a carbonating vessel 20 where any excess lime, if present, may be removed by treating the liquid with carbon dioxide or a gas containing it. For example, gases of combustion from a suitable source 21 may be introduced into the carbonating vessel 20 by means of a blower 22, and a suitable distributing device 23.

The resultant carbonate is separated from the solution and the clear liquid is transferred to a second vessel 24 known in this instance as a chlorinator. In this vessel 24 the liquid is treated with chlorine gas from a suitable source 25 and the bromine is liberated.

The dephenolized liquor, now substantially free of bromine, is withdrawn from the chlorinator 24 and may be discharged at will by reason of the fact that it contains no tar acid or tar acid compound, while the liberated bromine is transferred to the mixing tank 15 and is then returned in the form of bromine water to the reaction vessel 3 for the treatment of further quantities of liquid.

This transfer of the bromine may be aided by any suitable means, such as a current of inert gas or steam supplied from a source 27, as shown.

It will be obvious to those skilled in the art that the various stages employed may be considerably varied so long as the desired results expressed are not deviated from; for example, some of the steps may be accomplished in the same vessel at different times, or even concurrently.

Moreover, various substitutes for the specific reagent recited may be employed as long as the indicated results are similar; for example, the liberation of bromine either from the sodium bromide solution leaving the generator 8 or the calcium bromide solution leaving the flotation vessel 4 may be accomplished where desired by electrolysis or by any suitable means substituted for the chlorination operation ordinarily preferred.

It is, for example, possible to treat the tar acid-free liquid leaving the flotation vessel 4 by a process different from that used for the treatment of the liquid leaving the agitator vessel 8, and in fact it may be very desirable to do so, on account of the fact that the bromine is present in much lower degree of concentration in the former than in the latter, and for other reasons.

Consequently, some process especially adapted to recover bromine from very dilute solutions, such as the aniline precipitation method used for the recovery of bromine from sea water, or the parafin oil extraction method, may be employed at this stage.

My invention provides a novel process of accomplishing the removal of tar acid from liquid containing it that is highly effective and especially economical in that the reagent employed may be repeatedly used in cyclic fashion and losses of such reagent are effectively prevented.

The term "tar acid" as employed herein is intended to designate not only phenol ($C_6H_5OH$) itself, but analogous substances such as cresol, or mixtures of any of such analogous substances in any proportion.

My invention is not limited to the specific example hereinabove described by way of illustration, but may be variously embodied in practice within the scope of the claims hereinafter made.

I claim as my invention:

1. The process of removing tar acid from a liquid containing it which comprises treating the liquid with bromine, whereby said tar acid is precipitated in the form of a compound of tar acid and bromine, and removing said precipitate by subjecting the liquid to a froth flotation operation.

2. The process of removing tar acid from a liquid containing it which comprises treating the liquid with bromine to precipitate said tar acid in the form of a compound of tar acid and bromine, removing said precipitate from the liquid, treating it with a reducing agent to decompose it into its bromine and tar acid constituents, removing said bromine and using it for further treatment of the said liquid.

3. The process of removing tar acid from a liquid containing it, which comprises treating the liquid with bromine to precipitate said tar acid in the form of a compound of tar acid and bromine, removing said precipitate from the liquid, treating it with a reducing agent to effect a re-separation of its bromine and tar acid constituents, removing bromine from said treated precipitate and from the residual liquid from which the precipitate was removed, and re-using it for the treatment of further quantities of liquid containing tar acid.

4. The process of removing tar acid from a liquid containing it which comprises treating the liquid with bromine to precipitate said tar acid in the form of a compound of tar acid and bromine, removing said precipitate from the liquid, treating the liquid with carbon dioxide and chlorine to separate the phenol and bromine contained therein, and using said bromine for the treatment of further quantities of the liquid.

5. The process of removing tar acid from a liquid containing it which comprises treating the liquid with bromine to precipitate said tar acid in the form of a compound of tar acid and bromine, removing the precipitated compound from the liquid, treating the compound with a solution of a reducing agent to decompose the same into a bromide, and treating the resultant solution with carbon dioxide and with chlorine to effect a reseparation of its tar acid and bromine constituents, and using said bromine for the treatment of further quantities of the liquid.

In testimony whereof, I have hereunto subscribed my name this 18th day of December, 1928.

HAROLD J. ROSE.